United States Patent
Reinis et al.

(10) Patent No.: US 7,168,313 B2
(45) Date of Patent: Jan. 30, 2007

(54) ROTARY REMOTE VISUAL LIQUID QUANTITY INDICATOR

(75) Inventors: Filip A. Reinis, Long Beach, CA (US); Steven R. Eccles, Torrance, CA (US); Mathew C. Schacht, Torrance, CA (US)

(73) Assignee: Honeywell International, Inc., Morristown, NJ (US)

( * ) Notice: Subject to any disclaimer, the term of this patent is extended or adjusted under 35 U.S.C. 154(b) by 223 days.

(21) Appl. No.: 10/938,793

(22) Filed: Sep. 10, 2004

(65) Prior Publication Data

US 2006/0053879 A1    Mar. 16, 2006

(51) Int. Cl.
*G01F 23/42* (2006.01)

(52) U.S. Cl. ..................... 73/290 R; 73/321

(58) Field of Classification Search ............. None
See application file for complete search history.

(56) References Cited

U.S. PATENT DOCUMENTS

| | | | |
|---|---|---|---|
| 943,596 A | 12/1909 | Hans | |
| 2,074,959 A | 3/1937 | Guest | |
| 2,522,988 A | 9/1950 | Caddell | |
| 2,874,574 A * | 2/1959 | Patureau | 73/321 |
| 3,878,916 A * | 4/1975 | White, Jr. | 182/145 |
| 3,974,695 A * | 8/1976 | Lerner | 73/304 C |
| 4,167,874 A * | 9/1979 | Grant | 73/290 R |
| 5,050,432 A * | 9/1991 | Barritt | 73/309 |
| 5,144,836 A | 9/1992 | Webb | |
| 5,331,850 A * | 7/1994 | Loos | 73/293 |
| 5,533,392 A * | 7/1996 | Kira | 73/290 B |
| 5,651,285 A * | 7/1997 | Legras | 73/290 V |

* cited by examiner

*Primary Examiner*—Hezron Williams
*Assistant Examiner*—Paul M. West
(74) *Attorney, Agent, or Firm*—Oral Caglar, Esq.

(57) ABSTRACT

A rotary remote visual liquid quantity indicator allows a user to remotely determine the amount of liquid in a container, such as an accumulator on an aircraft. A flexible rotary cable assembly may be coupled between a rotatable drum and a remote indicator having a rotatable cap, the rotatable drum responsive to axial motion of a sweeper within the accumulator. Changes in the fluid level of the accumulator may be translated into rotational motion of the rotatable drum, which, via the flexible rotary cable assembly, changes a reading on a remotely located indicator.

37 Claims, 2 Drawing Sheets

ROTARY REMOTE VISUAL LIQUID QUANTITY INDICATOR

BACKGROUND OF THE INVENTION

The present invention generally relates to methods and apparatus for determining the fluid level of a container, such as an accumulator, and more specifically, to methods and apparatus for determining the fluid level of a container without the need for either electrical power or a direct line of sight to the container.

Accumulators are frequently used on military and commercial aircraft to accommodate the thermal expansion of coolant and hydraulic fluids. During aircraft servicing, maintenance personnel need to ascertain if the respective liquid loop contains the appropriate fluid level. Often, the accumulator is located in an inconvenient space for visual inspection and there is no aircraft electrical power available to operate a level sensor.

U.S. Pat. No. 943,596, issued to Hans, discloses a method of indicating the height of liquid in a tank. A float is attached to a cable and as the float rises and falls, the cable moves in a linear direction. The opposite end of the cable is wrapped around a drum, which turns linear cable motion into rotational motion of the drum. Additional gearing eventually translates the rotational motion of the drum into rotational motion of a dial indicator, allowing visual indication of the liquid level. The indicator housing is attached to the float housing, requiring a visual line of sight to make a liquid level reading. This requirement of a visual line of sight, as used by Hans, may not be useful in applications such as an aircraft, where components are closely assembled, possibly blocking many sight lines to liquid containers.

U.S. Pat. No. 2,074,959, issued to Guest, discloses a fuel tank gauge that may be remotely located. In the Guest patent, the liquid movement is transferred to linear motion of either a cable or a chain. The cable of Guest is located in a conduit that extends to the gauge. The cable moves linearly in the conduit, wherein the linear motion of the cable is translated to rotary motion of the gauge. This linear cable movement requires a relatively linear path from the tank to the gauge in order to avoid the linearly moving cable from getting stuck in the conduit due to kinking or the like.

U.S. Pat. No. 2,522,988, issued to Caddell, discloses a method of indicating oil level using a float that drives a chain in a linear motion. The chain is looped over a sprocket causing the sprocket and attached shaft to move in a rotary motion. One end of the shaft may be connected to an indicator assembly. The shaft of the Caddell patent appears to be a rigid shaft, thereby requiring the indicator to be located linearly away from the oil tank. In situations where there is no line of sight to the tank, there would usually also be no direct linear line for a shaft to run to drive a remote indicator, as would be required in the Caddell gauge.

As can be seen, there is a need for improved methods and apparatus for determining the fill level of a container, such as an accumulator, at a location more convenient for maintenance and without the need for electrical power or a direct line of sight to the accumulator.

SUMMARY OF THE INVENTION

In one aspect of the present invention, an apparatus for remotely measuring fluid level in a container comprises a reservoir sweeper axially responsive to changing fluid levels within the container; a cable connecting the reservoir sweeper with a rotatable member, wherein linear movement of the reservoir sweeper rotationally moves the rotatable member; a flexible rotary cable assembly rotationally connected to the rotatable member; and an indicator responsive to rotational motion of the rotary cable assembly.

In another aspect of the present invention, an apparatus for remotely measuring the liquid quantity of a fluid in an accumulator of an aircraft comprises a reservoir sweeper axially responsive to changing fluid levels within the accumulator; a cable connecting the reservoir sweeper with a rotatable member, wherein axial movement of the reservoir sweeper rotationally moves the rotatable member; a flexible rotary cable assembly rotationally connected to the rotatable member; an indicator connected to the rotary cable assembly; and a spring providing rotational resiliency to the rotatable member, thereby maintaining tension of the cable.

In yet another aspect of the present invention, an accumulator having a remote fluid level indication feature comprises a reservoir sweeper axially responsive to changing fluid levels within the accumulator; a cable connecting the reservoir sweeper with a drum, wherein axial movement of the reservoir sweeper rotationally moves the drum; a flexible rotary cable assembly rotationally connected to the drum; an indicator connected to the rotary cable assembly; and a spring providing rotational resiliency to the drum, thereby maintaining tension of the cable.

In a further aspect of the present invention, an accumulator for an aircraft having a remote fluid level indication feature comprises a reservoir sweeper axially responsive to changing fluid levels within the accumulator; a cable connecting the reservoir sweeper with a rotatable member, wherein axial movement of the reservoir sweeper rotationally moves the rotatable member; a flexible rotary cable assembly rotationally connected to the rotatable member; an indicator connected to the rotary cable assembly; a spring providing rotational resiliency to the rotatable member, thereby maintaining tension of the cable; an external connecting member located on the exterior of the accumulator, the external connecting member rotationally connecting the rotary cable assembly with the rotatable member; and a shaft rotationally connecting the external connecting member with the rotatable member.

In still a further aspect of the present invention, a method for remotely determining the level of a fluid in an container comprises a) translating axial motion of a reservoir sweeper in the container into rotational motion of a rotatable member; b) carrying the rotational motion of the rotatable member across a flexible rotary cable assembly to an indicator positioned at a remote location; and c) translating the rotational motion of the indicator into a desired measurement.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides apparatus and methods to remotely determine the amount of liquid in a container, such as an accumulator on an aircraft. Often the accumulator may be located in an inconvenient space wherein fluid levels may not be viewed easily. The present invention allows for the determination of accumulator fill level in a location more convenient for a user, such as a maintainer, without the need for electrical power or a direct line of sight to the accumulator. Changes in the fluid level of the accumulator may be translated into rotational motion of a cable, which, in turn, changes a reading on a remotely located indicator.

Conventional remote fluid level indicators have used a push-pull, linear motion cable, whereby changes in the fluid level in a container are translated into linear motion of a cable. This linear motion is then translated into changes in an indicator, which may be located remotely from the container. In these push-pull-type cables, however, cable binding may be a significant problem, especially when the cable does not follow a linear path from the container to the indicator. In other words, a bent cable, as may often be necessary in crowded aircraft compartments, is more apt to bind up when relied upon for its linear movement. The present invention, by using a rotary cable assembly, avoids this problem of conventional remote fluid level indicators.

Conventional remote fluid level indicators may also use a rigid cable, whereby changes in the fluid level in a container are translated into either linear or rotary motion of a shaft, whereby movement of the shaft results in changes in a remote indicator. This type of conventional assembly, however, uses only a rigid shaft, and, therefore, must result in the remote indicator being located linearly from the container, thereby greatly limiting the functionality and location of the remote indicator, especially in situations where the container is almost surrounded by other components, beyond which a remote indicator is desired. The present invention, by using a flexible rotary cable assembly, avoids this problem of conventional remote fluid level indicators.

Figure 1:
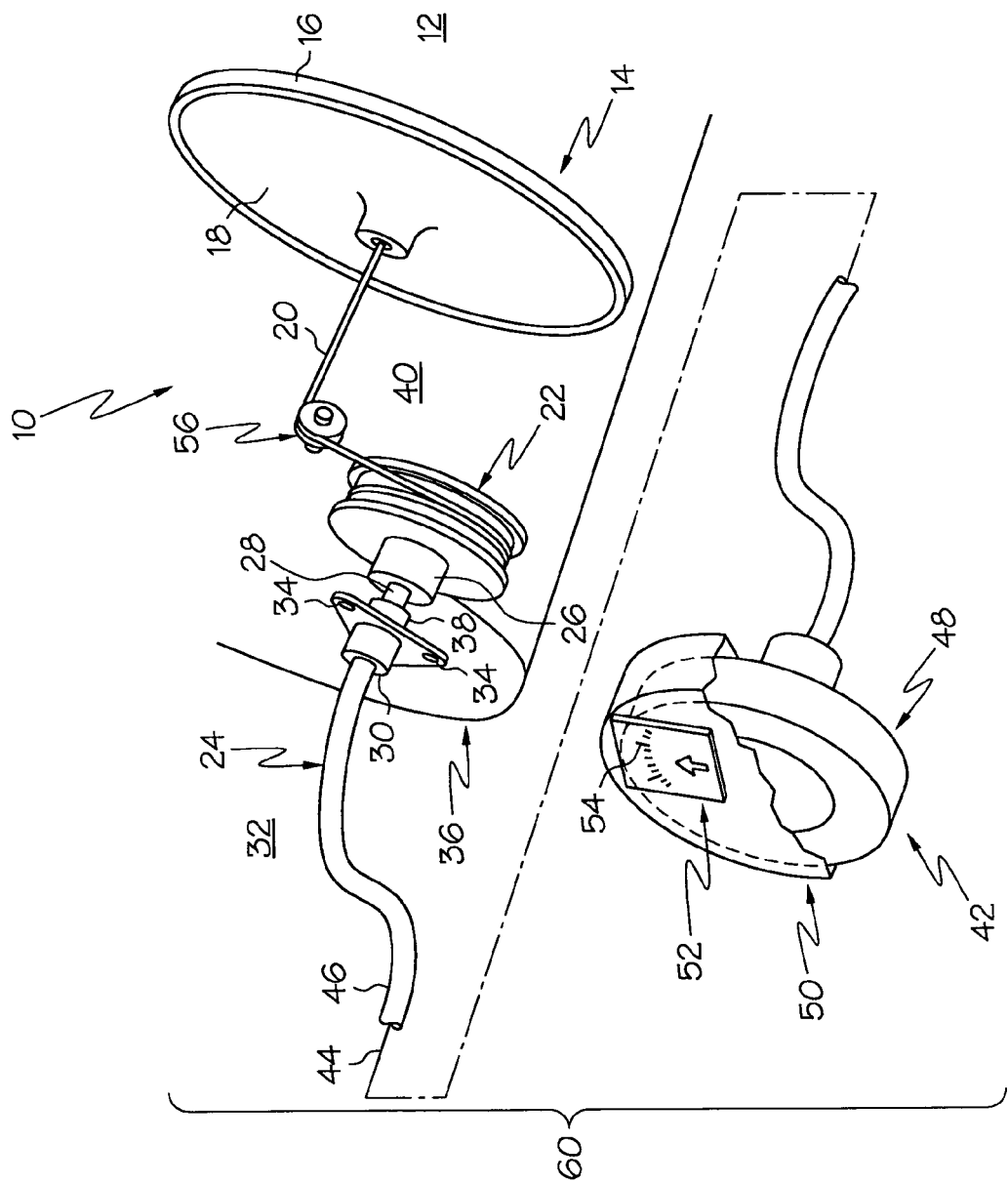
FIG. 1 is a schematic representation of a remote visual liquid quantity indicator according to one embodiment of the present invention.
Figure 2:
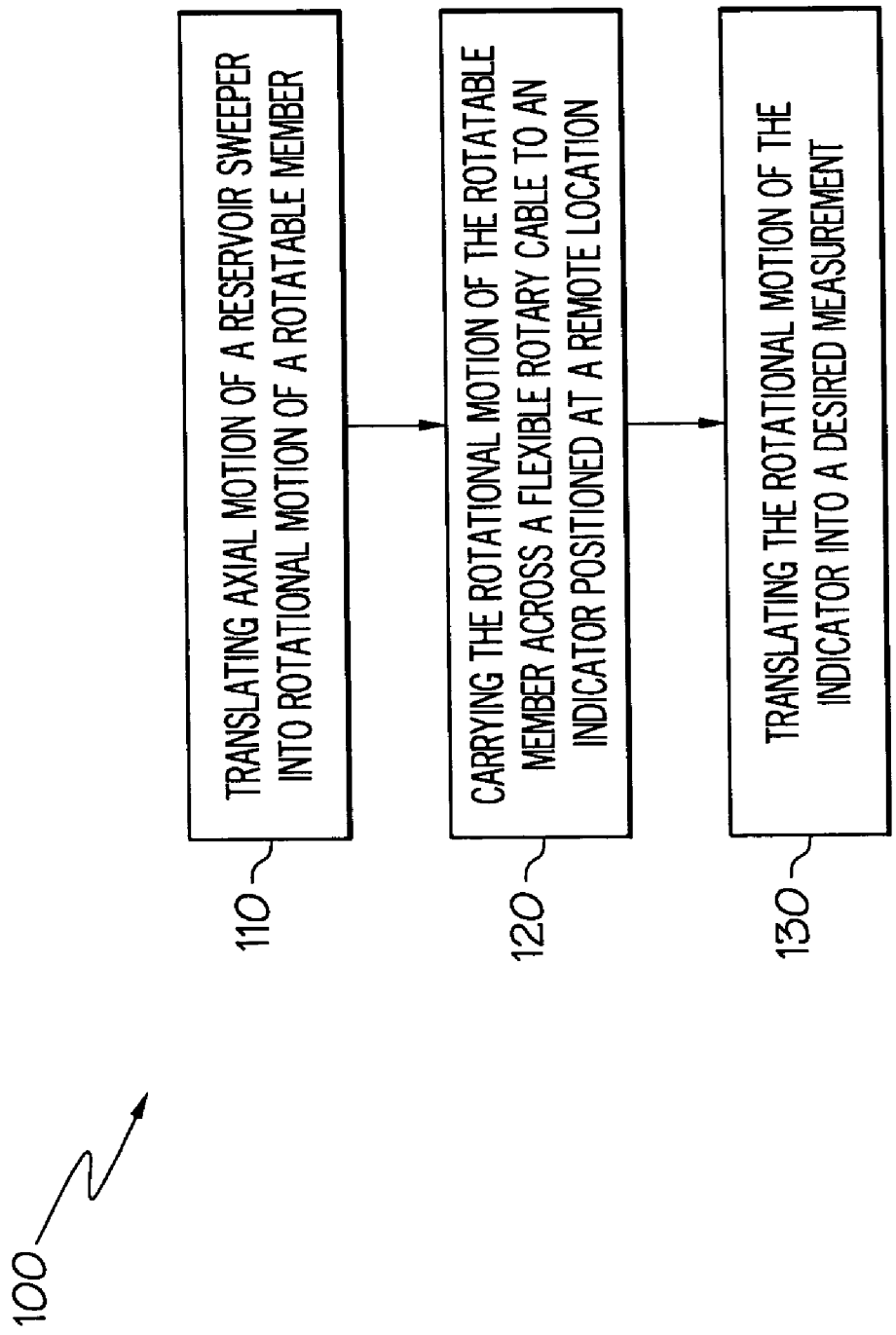
FIG. 2 is a flow chart representing steps involved in a method for remote visual liquid quantity indication according to another embodiment of the present invention.

Referring to FIG. 1, there is shown a perspective view of a rotary remote visual liquid quantity indicator apparatus 60 according to one embodiment of the present invention. A container, such as an accumulator 10, may be a metal bellows, rolling diaphragm or piston-type accumulator, as are well known in the art. No specific form of accumulator 10 is required, so long as there is a portion thereof, as discussed below, that may move with changes in the level of a fluid 12 within accumulator 10.

A reservoir sweeper 14 may be included within accumulator 10. Reservoir sweeper 14 may separate a first side 16 of reservoir sweeper 14, which may contain fluid 12, from a second, opposite side 18 of reservoir sweeper 14. Reservoir sweeper 14 may allow for the expansion and contraction of the volume of fluid 12 on the first side 16.

A cable 20 may be provided within accumulator 10 to connect second, opposite side 18 of reservoir sweeper 14 to a drum 22. A pulley 56 may be provided within accumulator 10 to feed cable 20 into drum 22 at the same radial plane as drum 22. A spring, such as a clock spring (not shown), may be connected to or contained within drum 22 to provide a continual tension on cable 20, thereby preventing any slack from forming along cable 20. The spring in drum 22 may be any conventional spring that may provide rotational resiliency to drum 22. For example, the spring may be similar to that found on conventional tape measuring tapes. This spring/drum 22 assembly may allow cable 20 to be resiliently extended from drum 22. Therefore, linear movement of reservoir sweeper 14 may be translated into rotational movement of drum 22.

A rotary cable assembly 24 may be connected to drum 22 whereby rotational movement of drum 22 may be translated into rotational movement of rotary cable assembly 24. Rotary cable assembly 24 may be connected to drum 22 in a manner that allows for the rotational movement of drum 22 to be carried by rotary cable assembly 24. For example, in some embodiments (not shown), rotary cable assembly 24 may be connected directly to a connecting member 26 on drum 22. Alternatively, and as shown in FIG. 1, a shaft 28 may join connecting member 26 to an external connecting member 30 located on an exterior 32 of accumulator 10. External connecting member 30 may contain bores 34 for affixing external connecting member 30 to the exterior of accumulator housing 36. External connecting member 30 may be a component for joining two rotating members, and external connecting member 30 is not limited to the structure shown in FIG. 1. For example, external connection member 30 may contain bearings (not shown) for providing an interface between external connection member 30 and shaft 28 and/or rotary cable assembly 24.

A shaft seal 38 may be included in external connecting member 30 to provide a seal to separate an expansion space 40 inside accumulator 10 from the exterior 32 of accumulator 10. Shaft seal 38 may be particularly useful in gas pressurized accumulators 10, wherein a pressurized gas is provided in expansion space 40 to exert pressure against the second, opposite side 16 of reservoir sweeper 14.

Rotary cable assembly 24 may comprise a flexible cable capable of carrying rotational movement from external connecting member 30 to a remote indicator 42. For example, in some embodiments (not shown) rotary cable assembly 24 may be made of a solid or hollow flexible member, such as a solid or hollow flexible polymer or metal. Alternatively, and as shown in FIG. 1, rotary cable assembly 24 may contain a flexible cable 44 provided coaxially within a flexible cable housing 46. The latter arrangement may be used to provide protection to the flexible cable 44.

Rotary cable assembly 24 may be rotated via drum 22 and may be coupled to remote indicator 42. Various indicators capable of measuring rotational movement may be used as remote indicator 42. Such indicators capable of measuring rotational movement are well known in the art. For example, the rotational movement of rotary cable assembly 24 may be rotationally connected to a remote indicator cap 48 housed within a remote indicator housing 50. Indicator housing 50 is shown in FIG. 1 as being partially broken away to reveal underlying structure. An indicator window 52 may be provided in indicator housing 50 to allow for determining the rotational position of remote indicator cap 48. A ruled scale 54 may be provided on remote indicator cap 48 to allow a user to coordinate the movements of indicator cap 48 with changes in fluid levels. The rotational position of remote indicator cap 48 may be read by any conventional means in addition to the ruled scale 54 as described above. For example, the rotational position of remote indicator cap 48 may be translated to a numerical readout.

The present invention also provides for a method 100 for remotely determining the level or quantity of a fluid in an accumulator. A step 110 may involve translating linear motion of a reservoir sweeper of an accumulator into rotational motion of a rotatable member, such as a drum. A step 120 may involve translating the rotational motion of the drum, via a flexible rotary cable assembly, to an indicator positioned at a remote location. For example, step 120 may involve translating rotation of the rotary cable assembly into rotation of a remote indicator cap of the indicator. A step 130 may involve translating rotational motion of the indicator into a desired measurement. For example, the remote indicator may be calibrated for measuring volume of fluid in the accumulator or other container. As an example, the indicator may have an indicator and a ruled scale, as described hereinabove with reference to FIG. 1.

According to another aspect of the present invention, an increase in temperature may cause an increase in the amount of fluid in the accumulator. Therefore, according to some embodiments of the present invention, it may be desired to measure temperature of the fluid in the accumulator, and the indicator may be calibrated such that the scale on the indicator measures temperature of the fluid in the accumulator.

While the invention has been described with respect to the measurements of fluid within an accumulator, the invention is not so limited, but rather the fluid inside other containers may also be measured, provided that a reservoir sweeper similar to that described with respect to FIG. 1 changes linear position with changing fluid level.

It should be understood, of course, that the foregoing relates to exemplary embodiments of the invention and that modifications may be made without departing from the spirit and scope of the invention as set forth in the following claims.

We claim:

1. An apparatus for remotely measuring fluid level in a container comprising:
   a reservoir sweeper axially responsive to changing fluid levels within the container;
   a cable connecting the reservoir sweeper with a rotatable member, wherein axial movement of the reservoir sweeper rotationally moves the rotatable member;
   a flexible rotary cable rotationally connected to the rotatable member; and
   an indicator responsive to rotational motion of the rotary cable, and
   wherein the indicator includes a remote indicator dial located within an indicator housing and an indicator window in the indictor housing for viewing a position of the remote indicator dial, the remote indicator dial rotationally attached to the rotary cable.

2. The apparatus according to claim 1, wherein the container is an accumulator.

3. The apparatus according to claim 1, further comprising a spring providing rotational resiliency to the rotatable member, thereby maintaining tension of the cable.

4. The apparatus according to claim 1, wherein the rotary cable is coaxially inserted within a flexible cable housing.

5. The apparatus according to claim 1, wherein the rotary cable is a solid flexible member.

6. The apparatus according to claim 1, further comprising an external connecting member located on the exterior of the container, the external connecting member rotationally connecting the rotary cable with the rotatable member.

7. The apparatus according to claim 6, further comprising a shaft rotationally connecting the external connecting member with the rotatable member.

8. The apparatus according to claim 6, further comprising a shaft seal to provide a seal to separate an expansion space inside the container from the exterior of the container.

9. The apparatus according to claim 1, further comprising a pulley, the pulley guiding the cable from the reservoir sweeper to the rotatable member.

10. The apparatus according to claim 1, wherein the fluid is one of hydraulic fluid, oil and coolant.

11. An apparatus for remotely measuring the liquid quantity of a fluid in an accumulator of an aircraft comprising:
    a reservoir sweeper axially responsive to changing fluid levels within the accumulator;
    a cable connecting the reservoir sweeper with a rotatable member, wherein axial movement of the reservoir sweeper rotationally moves the rotatable member;
    a flexible rotary cable rotationally connected to the rotatable member, wherein rotational movement of the rotatable member rotates the flexible rotary cable;
    an indicator connected to the rotary cable; and
    a spring providing rotational resiliency to the rotatable member, thereby maintaining tension of the cable.

12. The apparatus according to claim 11, wherein the rotary cable is coaxially inserted within a flexible cable housing.

13. The apparatus according to claim 11, further comprising:
    an external connecting member located on the exterior of the accumulator, the external connecting member rotationally connecting the rotary cable with the rotatable member; and
    a shaft rotationally connecting the external connecting member with the rotatable member.

14. The apparatus according to claim 13, further comprising a shaft seal to provide a seal to separate an expansion space inside the accumulator from the exterior of the accumulator.

15. The apparatus according to claim 11, further comprising a pulley, the pulley guiding the cable from the reservoir sweeper to the rotatable member.

16. An apparatus for remotely measuring fluid level in a container comprising:
    a reservoir sweeper axially responsive to changing fluid levels within the container;
    a cable connecting the reservoir sweeper with a rotatable member;
    a flexible rotary cable assembly rotationally connected to the rotatable member; and
    an indicator responsive to rotational motion of the rotary cable assembly;
    wherein the indicator includes a remote indicator dial located within an indicator housing and an indicator window in the indictor housing for viewing a position of the remote indicator dial, the remote indicator dial rotationally attached to the rotary cable assembly.

17. An accumulator having a remote fluid level indication feature comprising:
    a reservoir sweeper axially responsive to changing fluid levels within the accumulator;
    a cable connecting the reservoir sweeper with a drum, wherein axial movement of the reservoir sweeper rotationally moves the drum;
    a flexible rotary cable rotationally connected to the drum, wherein rotational movement of the drum rotates at least a portion of the flexible rotary cable;

an indicator connected to the rotary cable; and
a spring providing rotational resiliency to the drum, thereby maintaining tension of the cable.

18. The accumulator according to claim 17, wherein the rotary cable is coaxially inserted within a flexible cable housing.

19. The accumulator according to claim 17, further comprising:
an external connecting member located on the exterior of the accumulator, the external connecting member rotationally connecting the rotary cable with the drum; and
a shaft rotationally connecting the external connecting member with the drum.

20. The accumulator according to claim 17, further comprising a shaft seal for sealingly separating an expansion space inside the accumulator from the exterior of the accumulator, wherein the expansion space inside the accumulator is gas pressurized.

21. The accumulator according to claim 17, wherein the accumulator is one of a metal bellows, rolling diaphragm and a piston-type accumulator.

22. An accumulator having a remote fluid level indication feature, and the accumulator comprising:
a reservoir sweeper axially responsive to changing fluid levels within the accumulator;
a cable connecting the reservoir sweeper with a rotatable member, wherein axial movement of the reservoir sweeper rotationally moves the rotatable member;
a flexible rotary cable rotationally connected to the rotatable member, wherein rotational movement of the rotatable member rotates at least a portion of the flexible cable;
an indicator connected to the rotary cable;
a spring providing rotational resiliency to the rotatable member, thereby maintaining tension of the cable;
an external connecting member located on the exterior of the accumulator, the external connecting member rotationally connecting the rotary cable with the rotatable member; and
a shaft rotationally connecting the external connecting member with the rotatable member.

23. The accumulator according to claim 22, wherein the rotary cable is coaxially inserted within a flexible cable housing.

24. The accumulator according to claim 22, further comprising a shaft seal to provide a seal for sealingly separating an expansion space inside the accumulator from the exterior of the accumulator, wherein an expansion space inside the accumulator is gas pressurized.

25. An aircraft having an accumulator with a remote fluid level indication feature, and the accumulator comprising:
a reservoir sweeper axially responsive to changing fluid levels within the accumulator;
a cable connecting the reservoir sweeper with a rotatable member, wherein axial movement of the reservoir sweeper rotationally moves the rotatable member;
a flexible rotary cable rotationally connected to the rotatable member, wherein rotational movement of the rotatable member rotatably moves at least a portion of the flexible rotary cable;
an indicator connected to the rotary cable;
a spring providing rotational resiliency to the rotatable member, thereby maintaining tension of the cable;
an external connecting member located on the exterior of the accumulator, the external connecting member rotationally connecting the rotary cable with the rotatable member; and
a shaft rotationally connecting the external connecting member with the rotatable member.

26. The accumulator according to claim 25, wherein the rotary cable includes a flexible cable coaxially inserted within a flexible cable housing.

27. The accumulator according to claim 25, further comprising a shaft seal to provide a seal for sealingly separating an expansion space inside the accumulator from the exterior of the accumulator, wherein an expansion space inside the accumulator is gas pressurized.

28. A method for remotely determining the level of a fluid in a container comprising:
a) translating axial motion of a reservoir sweeper in the container into rotational motion of a rotatable member;
b) carrying the rotational motion of the rotatable member across a flexible rotary cable to an indicator positioned at a remote location by causing the flexible rotary cable to rotate; and
c) translating the rotational motion of the indicator into a desired measurement.

29. The method according claim 28, wherein the container is an accumulator in an aircraft.

30. The method according to claim 28, wherein the step a) comprises resiliently extending a cable from the rotatable member to a surface of the reservoir sweeper, wherein linear motion of the reservoir sweeper causes rotational movement of the rotatable member via the cable.

31. The method according to claim 30, further comprising guiding the cable from the reservoir sweeper to the rotatable member via a pulley.

32. The method according to claim 28, wherein the flexible rotary cable is coaxially inserted within a flexible cable housing.

33. The method according to claim 28, wherein the flexible rotary cable is a solid flexible member.

34. The method according to claim 28, further comprising sealing an exterior of the container from an expansion space inside the container with a shaft seal.

35. The method according to claim 28, wherein the step b) includes connecting the flexible rotary cable directly to the rotatable member.

36. The method according to claim 28, wherein the step b) includes connecting the flexible rotary cable to an external connecting member affixed to an exterior of the container, and connecting the external connecting member to the rotatable member via a shaft.

37. The method according to claim 28, wherein the step c) comprises: rotating an indicator dial of the indicator in proportion to an amount of said rotational motion of the rotatable member.

* * * * *